Aug. 21, 1934.　　　G. H. SNYDER ET AL　　　1,970,581
BOX MAKING MACHINE
Filed March 29, 1933　　6 Sheets-Sheet 3

Aug. 21, 1934.  G. H. SNYDER ET AL  1,970,581
BOX MAKING MACHINE
Filed March 29, 1933  6 Sheets-Sheet 4

Patented Aug. 21, 1934

1,970,581

UNITED STATES PATENT OFFICE 1,970,581

BOX MAKING MACHINE

George H. Snyder, Glenside, and Allen G. Snyder, Chestnut Hill, Pa.

Application March 29, 1933, Serial No. 663,256

17 Claims. (Cl. 93—58)

This invention relates to box making machines and the process of making a box.

In our application Ser. No. 645,138, filed December 1, 1932, we disclosed the simulation of a conventional wooden box, such as a cigar box, made of cardboard, formed and cut to provide the sharp shoulders, smooth edges and thickened walls of the conventional wooden cigar box. The present invention relates specifically to a machine for forming and trimming or cutting the box disclosed in the above mentioned application.

As it has been found expedient to provide a shell and tray formation of cardboard box, it has not only been found difficult to provide the ends of the box higher than the sides thereof with a sharp corner upon the higher ends above the sides, but it has been found difficult to provide independently formed box portions with walls of sufficiently close registration of their edges as to be even approximately flat or smooth. It is proposed herein to cut through the box walls to achieve the ends desired.

It is among the objects of the invention; to provide a machine in which assembled box bodies are automatically fed through the machine, and the upper edges of walls are trimmed off to provide smooth surfaces; to provide a box trimming machine in which walls are cut transversely from the inside of the box outwardly; to reduce the manual labor heretofore necessary in finishing boxes; to provide a machine which generally improves the art of box making; to provide a machine to which box bodies having walls of substantially uniform height are fed and from which box bodies having side walls lower than the end walls are delivered; to form a cardboard box the upper edges of which are cut surfaces; and many other objects and advantages as will become more apparent as the description proceeds.

Reference has been and will be made to stages or stations, of which there are in the preferred form three, but which obviously is susceptible to change as desired. The three stages may be identified as composed of a pressing station or stage, in which the inner and outer component parts of the composite box, known respectively as the tray and shell, are subjected to pressure to cause the previously glued surfaces to adhere to form a unitary box, and which may be identified in Fig. 1, as the first stage A; the second stage, B, is that in which the side walls of the unitary box are transversely cut and trimmed; and the third stage or station C, in which the end walls are transversely cut and trimmed.

Figures 4, 13:
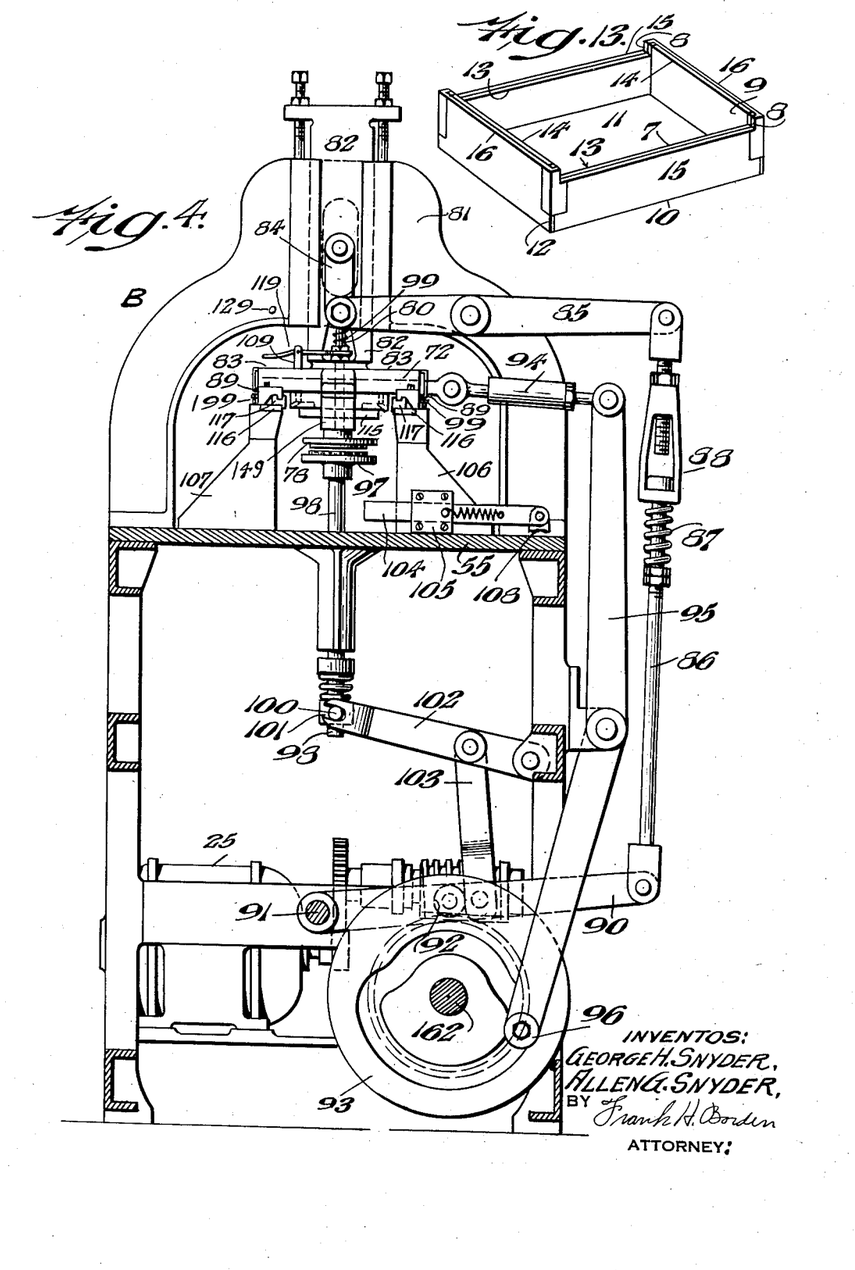
Fig. 4 represents a fragmentary vertical section through the second or side trimming stage of the machine, with parts broken away.
Fig. 13 represents a perspective view of the box as finished by the machine of this invention.

Reference to Fig. 13 discloses a unitary box 10, preferably comprised of an inner tray 11, and an outer shell 12. The tray has side walls 13 which preferably initially are substantially as high as its end walls 14. Obviously the box 10 may comprise a single box entity, formed as desired, and without a reinforcing nesting complement. However, it is preferred to provide a composite box. The shell has side walls 15 preferably initially as high as its end walls 16, and the unitary box is assembled with the upper edges of the respective sides and of the respective ends, all more or less in the same general plane parallel with the bottom. It may be noted in the connection that as a matter of fact it is practically impossible to secure more than general and approximate registration of the upper edges of the adjacent independent walls, which alone is inadequate to give the smooth planar upper surface necessary so that when covered it will simulate the smooth squared edge of the wall of a wooded box. This is due among other factors to the variations in fiber distribution in the cardboard, and to the variations in scoring and folding that follow.

Figure 2:
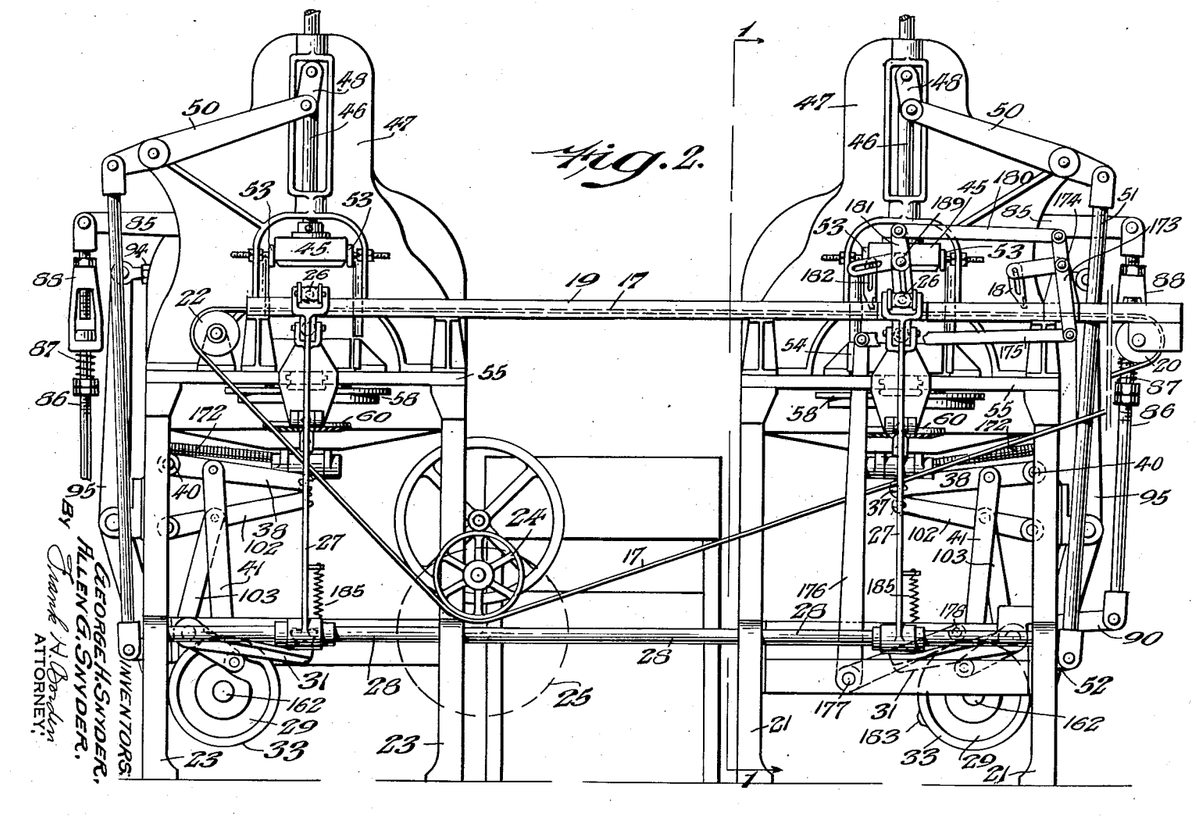
Fig. 2 represents an end elevation of a pair of operating units of the machine, with parts broken away and with parts removed.
Figures 3, 12:
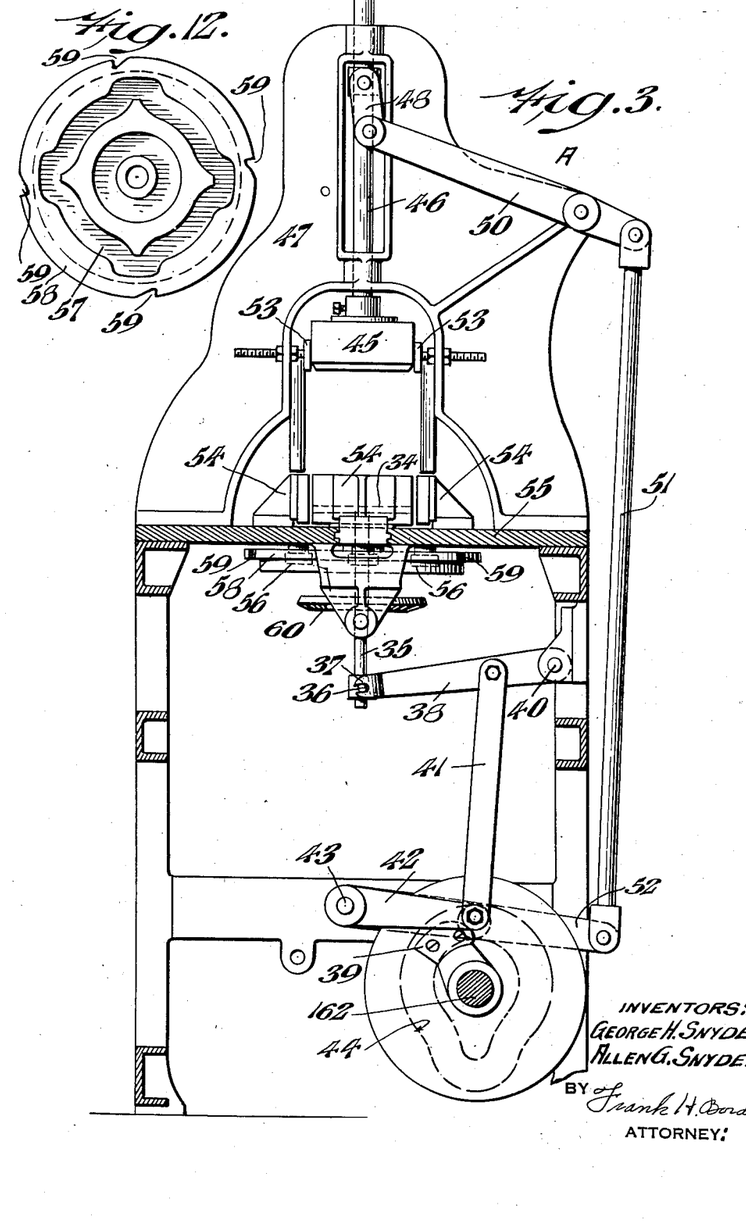
Fig. 3 represents a fragmentary vertical section through the first or pressing stage of the machine.
Fig. 12 represents a plan of the cam operating the parts in the first or pressing stage.

Assume that the shells and trays have been pasted and assembled in unpressed relation as unitary boxes 10 disposed upon the endless conveyor 17, where they are held against movement with the conveyor by the movable stop 18. The conveyor 17 runs over idler pulley 20, on the right hand battery of stages, carried on framework 21, over idler pulley 22 on the left hand battery of stages carried on framework 23, and over the driven pulley 24, driven by any suitable power source, such as by a motor 25, indicated in dotted lines in Fig. 2. It will be understood that a machine may comprise a single battery of stages, or a multiplicity thereof, and in the illustrative form there are two batteries, a left hand and a right hand, each finally delivering to a common point between the batteries. The conveyor travels perpendicularly to the direction of travel of a unitary box progressively through the successive stages and parallel to the direction of final ejection of the finished box.

Except for being right and left hand machines the respective batteries of stages are substantially identical, and parts of one are the same as parts for another except for directional disposition, so that but one machine need be described in detail.

Figure 1:
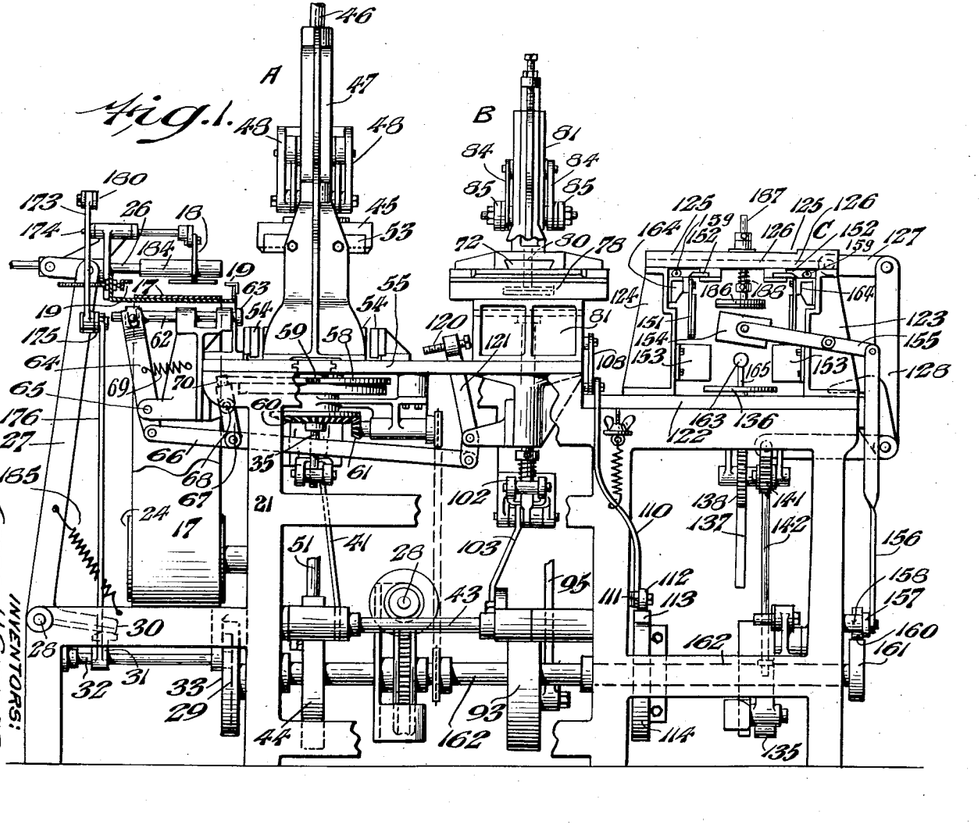
Fig. 1 represents a side elevation, partially in section, of one operating unit of the machine, with parts broken away.

Referring to Fig. 1, the first stage or station A, mounted upon the framework 21, is disposed laterally of conveyor 17, with the center of the stage in substantial vertical alignment with an ejecting plunger or kicker 26 carrying guard 184 and arranged for horizontal reciprocation by means of the bell crank lever 31, pivoted at 32, and actuated by a suitable groove 29 in the cam 33. The lateral guide strips 19 of the conveyor 17 are interrupted in alignment with the kicker 26 so as to permit a unitary box to be pushed off of the conveyor to drop into stage A. A table or floor 34 is provided in the middle of station A mounted on the vertically adjustable non-rotatable shaft 35. The latter has a cross pin 36 engaged by slots 37 in the end of lever 38, pivoted at 40, and connected pivotally to link 41 connected to lever 42 pivoted at 43, and actuated by a suitable cam 39. A vertically adjustable internal former pressing anvil or block 45 is mounted on the shaft 46, slidable in the fixed head 47, and connected through a suitable train or link 48, lever 50, link 51, to arm 52 pivoted on axis shaft 43, in position to be actuated by suitable means such as a groove in the cam 44. The former or block 45 has slidable movement relative to stationary strippers 53, arranged to strip the box from the former in the event it sticks or adheres thereto after pressing. A plurality, preferably four, of pressing walls, followers or movable abutments 54, are slidably guided in suitable grooves in the upper plate 55 of the frame, and each has a depending lug 56 riding in the groove 57 of the horizontal cam 58. The cam 58 is rotatable with a suitable gear 60, driven through a suitable pinion gear 61. It will be seen that with proper timing when a unitary box 10 drops upon the table 34, the former or block 45 drops down and enters the unitary box, and thereafter the respective movable abutments or walls are simultaneously brought into squeezing or pressing engagement with the respective walls of the box relative to the fixed former within the box. Thereafter the movable walls are retracted, the former or block 45 is elevated, possibly carrying the box with it to be stripped off by the strippers 53, to drop upon, or to rise with the table 34 which ascends, supporting the box, until the lower surface of the box is above the upper edges of the movable walls.

At this point the pressed and unified box is kicked laterally off the table 34, and into the second stage or station B, by means to be described. It is to be noted that stage or station A may be omitted or may be present in another independent machine, without adverse effect upon the remainder of the machine.

Figures 7, 8:
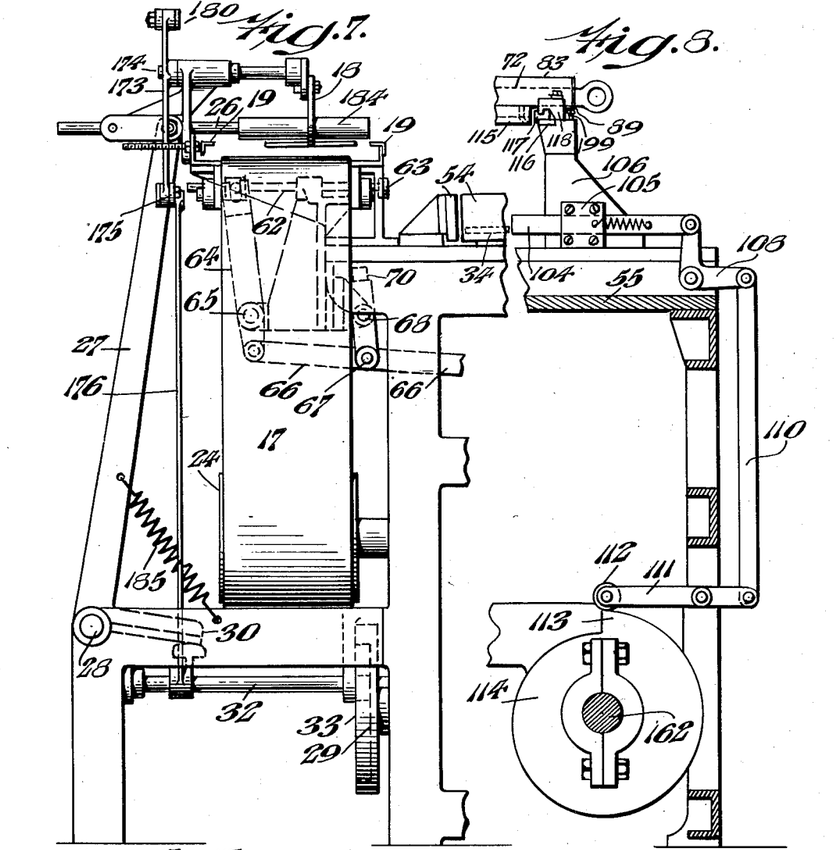
Fig. 7 represents a fragmentary side elevation of the end of the machine showing the conveyor and the ejecting device.
Fig. 8 represents a fragmentary vertical section through the movable stop or gauge to locate the work in the second or side trimming stage.

Referring to Figs. 1 and 7, there is disclosed a horizontal journalled shaft 62, carrying a head 63 to abut and eject the box. The shaft 62 is actuated in one direction at least by lever 64, pivoted at 65, and pivotally engaged by longitudinally shiftable link 66, actuated by a lever 67 pivoted at 68, and having an end 70 bearing upon and actuated by the outer edge of the cam 58, having peripheral indentations 59, preferably four in number. It will be observed that each quarter rotation of the cam 71 marks the maintenance of ejector plunger 62, 63 in retracted position during the pressing, followed by entry of lever end 70 into a recess 59, permitting a spring 69 to pull shaft or link 66 to work the ejectors to kick the pressed unitary box into the next or second stage B, wherein the side trimming is accomplished.

In explanation of the operation of the side trimmer, stage or station B, it might be noted that the essential thing in the trimming is the important function of transversely cutting a box wall edge. For the specific purposes of the invention, which are obviously susceptible to change means are to be provided so that a vertical cut may be made in the composite side walls in transverse alignment with the inner surfaces of the end walls of the tray. Thus, referring to Fig. 13, there is to be provided a vertical cut to form the vertical surface 8 as a continuation of the inner end surface 9, and, of course, there is also to be provided a horizontal transverse cut through the side wall to form a surface 7 which intersects the vertical cut surfaces 8 and which is parallel with the box bottom.

Figure 9:
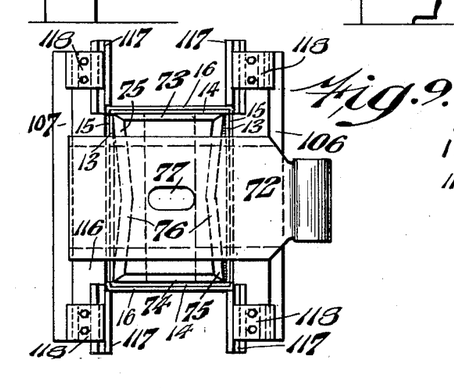
Fig. 9 represents a fragmentary plan of the side trimming knife operatively associated with a box to be cut.
Figure 10:
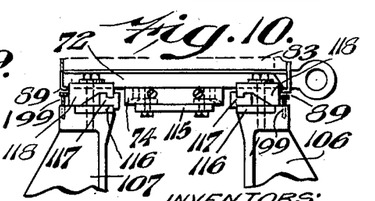
Fig. 10 represents a fragmentary end elevation of the side trimming knife and cooperating parts.

Referring to Figs. 4, 9, and 10 there is provided a horizontally reciprocatable cutter head 72, carrying the respective cutter blades and arranged for vertical adjustment or reciprocation with a guide to be described. Vertical cutters 73 and 74, the outer cutting edges of which are so spaced as to permit the cutter to vertically slidingly enter a box 10, (Fig. 9), so as to form the vertical cut surfaces 8, (Fig. 13) are rigidly secured to the cutter head in fixed relation to the horizontal side wall cutters 75, the cutting edge of which slants or tapers toward the center, as shown at 76, in Fig. 9, in order to facilitate the cutting. It is to be observed as a matter of interest and importance, that the lateral horizontal extent of the vertical cutters or trimmers, 73 and 74, is slightly less than the internal width of the unitary box 10, so that the disposition of the cutter within the box is facilitated, as is the seriatum cutting of one side wall, then the other, by appropriate horizontal movements of the cutter head. In Fig. 9 it will be noted that the aperture 77 is provided in cutter head 72, to permit the disposition of a kick stripper 78 (shown in dotted lines in Fig. 1, stage B, and in full lines and extended position in Fig. 4) disposed on vertical shaft 80, extending through the aperture 77. The kick stripper is arranged to descend and abut the bottom of the unitary composite box from the cutters to remove same vertically downwardly toward a complementary support to be described, from which latter the box is laterally ejected, as also to be described.

A stationary vertical guide piece 81 is provided mounted upon the top of table portion 55, and straddling the box supports and guides to be described. A cross head 82 is vertically slidable in the guide 81, and carries at its lower end the rigid cutter head guide 83, in which the cutter head 72 is horizontally slidable. The cross head carrying the cutter head guide is vertically reciprocable as a unit through the actuation of a link 84, pivoted at one end of the lever 85, in turn pivotally connected to the resilient link 86, having spring 87, and turnbuckle 88 arranged for length variation and adjustment, and the resilient link is pivotally connected to the lever 90, pivoted at 91, and having a boss or roller stud 92, riding in a suitable groove (not shown) of a cam 93. It is pointed out that as an incident of proper rotation of cam 93, the stud 92 will be raised and the cross head 82, and cutter head guide 83 will be lowered relative to the fixed guide 81, and will be held in lowered position while the cutter head is imparted three horizontal reciprocations relative to the cutter head guide. The latter movement is secured by means of a link 94, lever 95 having a roller 96 riding in an appropriate groove (not shown) in cam 93, and comprises a reciprocation from mid position to cut one side, an opposite reciprocation to cut the other side, and a third reciprocation to return to mid position.

In exactly timed and properly synchronized relation to the foregoing movement of the reciprocating parts, there is movement of the vertically adjustable supporting plate 97 mounted on vertically guided shaft 98, having cross pin 100 engaged by slots 101 in the end of lever 102, actuated by link 103 pivoted to the lever 90, and obviously moved upwardly, as cross head 82 moves downwardly.

As shown particularly in Fig. 8, a gauge or lateral removable stop 104 is provided slidable horizontally in a guide 105, mounted on a fixed abutment 106, of the pair of spaced abutments 106, 107. The longitudinally slidable stop is pivoted to bell crank lever 108, in turn connected through link 110, to lever 111, having a roller 112 riding upon the peripheral cam surface 113 of the cam 114.

Referring to Figs. 4, 9 and 10, the spaced abutments 106 and 107 form the anvil portions of the trimming cutters. They may be rigidly but detachably mounted on table 55 in such manner as to be capable of relative adjustment to accord with varying sizes of boxes, as the cutters themselves are so adjustable. It will be understood that the respective cutter blades 73, 74 and 75 are detachably mounted on a cutter block 115 which is removably mounted on the cutter head 72. It will be understood that the block and blades will be of a size appropriate for a given size of box, and that they will be varied in size as the box size is to be varied. It will be noted that the upper inner edges of the respective abutments 107 and 108 are preferably laterally spaced a slight distance greater than the lateral width of the cutter assembly, so as to permit free insertion of the box to be treated, with the cutter preferably slightly laterally movable within the box. The parallel edges of the abutments comprise hardened cutting or shearing edges with which the respective movable cutters have cooperating shearing actions in which the stationary edges "back up" or reinforce the wall of the box during cutting. The hardened edge strips are designated as 116. Adjustable guide or gauge corner blocks 117 are arranged to overhang the cutting edge strips 116 to define with the stationary cutting edges corner gauges to receive and reinforce the corners of the box during cutting. The corner blocks 117 are clamped in fixed position by clamps 118. The vertically upstanding portions of the corner blocks or gauges 117 form a reinforcement for the box surface adjacent to the trimming or cutting area.

It being desired to move the box from the second stage or station B into the third stage or station C, an ejector or kicker 120 is provided, mounted on a lever 121, pivoted to the longitudinally shiftable link 66, that moves the ejector kicker 62 already described and moved by spring 69 for ejection.

Stage or station C comprises a table portion 122, at a lower level than table top portion 55, upon which there is mounted the end web 123, and intermediate vertical supports 124, of which there are preferably two, laterally spaced to form an opening adequate to admit a box to the third station. Upon the upper ends of the end web and the intermediate supports, there is rigidly mounted a horizontal end cutter guide 125, in which the end trimmer or cutter head 126 is arranged to reciprocate. The end cutter head is connected by link 127 to bell crank lever 128, pivoted at 130. The other end of the bell crank lever 128 is pivotally connected to the substantially vertical shaft 131, pivoted to the lever 132 carrying roller 133 working in a groove 134 in the cam 135.

Figures 5, 6, 11, 14:
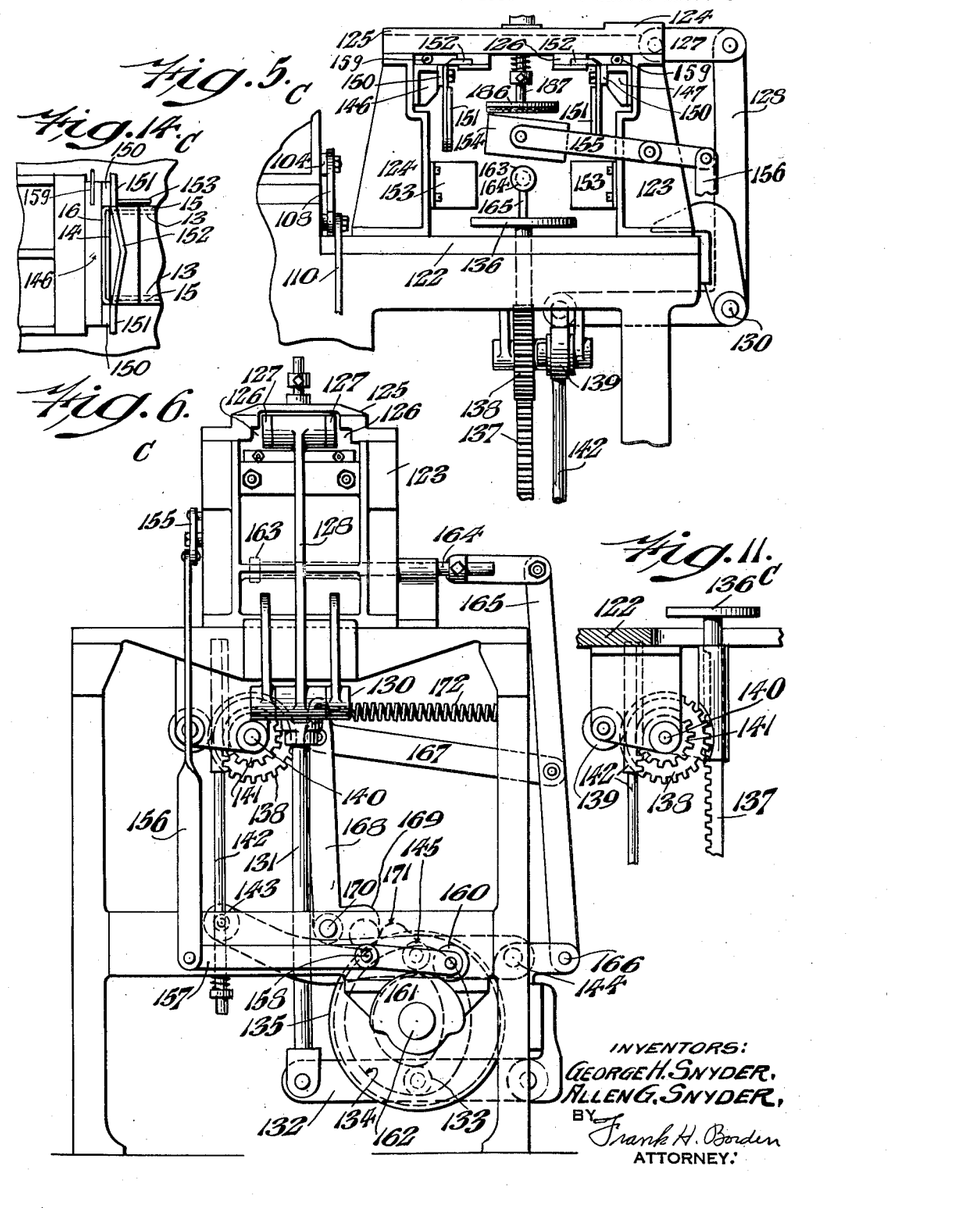
Fig. 5 represents a fragmentary side elevation of the third or end trimming stage of the machine.
Fig. 6 represents an end elevation of the same.
Fig. 11 represents a fragmentary elevation, partially in section, of the elevating mechanism for the boxes to carry them into operative association with the trimming knives.
Fig. 14 represents a fragmentary plan of the end trimming parts in operative association relative to a box end wall.

In the middle of the third stage in alignment with the opening between the vertical abutments 124 there is provided a movable support or table 136 movable relative to the table 122 and mounted upon the rack 137, in mesh with pinion gear 138 mounted on shaft 140 (Fig. 11). Pinion 141 rigid with shaft 140 is in mesh with an actuating rack 142 and held in mesh by an idler roller 139, the lower end of rack 140 being pivotally connected to lever 143, pivoted to the framework at 144 and having a roller 145 working in a suitable groove in cam 135. It will be clear that rotation of cam 135 subjects rack shaft 142 to vertical reciprocations which are transmitted through the gearing and amplified in the motion of vertically movable table 136.

The vertical abutments 124 and 123 carry the transverse anvil portions 146 and 147 comprising hardened "backing up" edges. On each anvil or complementary shearing portion 146 and 147 there are provided lateral corner guide blocks 150 arranged to engage the lateral side edges of the unitary box and being provided with the depending converging tapered or flared guides 151, arranged to maintain proper alignment of the box as it is guided upwardly just previous to the trimming operation. The end cutter head 126 carries the transverse knife blades 152, arranged to enter between the blocks 150 to engage shearingly the stationary edges 146. Fixed but adjustable lateral guides 153 are provided on one side of the opening of station C while a movable stop or guide 154 is provided arranged for temporary removable relation with the fixed guides, to hold the box against undesired movement out of the third stages. The movable guard or barrier 154 is mounted upon the lever 155 connected through link 156 with a lever 157 pivoted to the framework of the machine at 158 and having a roller 160 riding upon a cam 161, the axis of which 162 is concentric with the axis of cam 135.

An ejector 163 mounted on the horizontally slidable shaft 164 is pivotally connected to lever 165 pivoted to the framework at 166 and connected through link 167 with a bell-crank lever 168, pivoted at 170 and having its toe 169 tripped by the hump 171 on the periphery of cam 135. It will be understood that the horizontal ejection action of the plunger 163 in response to actuation by the cam is immediately followed by retraction of the ejector owing to the tension exerted by spring 172.

In considering a cycle of operations of the machine it will be understood that the several cams of the device bear mutually synchronized relations and that the work preferably proceeds through both batteries simultaneously in order to secure the most efficient production.

Assuming that other machines have produced the shells and trays of the unitary box 10, and that they have been nested properly with adhesive between component units, but have not yet been pressed, there will be a series of such unpressed, assembled boxes disposed upon the right hand end of belt 17 (Fig. 2), moved to abutment against stop 18. The presence of stop 18 causes belt 17 to slide under the boxes.

The stop 18 is adjustably mounted upon an arm of the compound bell-crank lever 173, pivoted at 174, the lower end of which is connected through link 175 with bell-crank lever 176 pivoted at 177 and having a roller 178 riding the outer periphery of cam 33. A link 180 extends from the top of the bell-crank lever 174 to the bell-crank 181 pivoted at 189, the free arm of which adjustably carries the stop 182. It will be observed that through the linkage just described stops 18 and 182 will be raised and lowered in synchronism, as roller 178 on the bell-crank lever 176 is struck by the enlargement or hump 183 on the outer periphery of cam 33. The ejector 26, carrying the lateral aligning guard 184 normally stands out of the path of boxes moving with belt 17 so that elevation of both stops 18 and 182 for a brief interval permits two boxes to pass under stop 18 but to abut and be stopped by stop 182 in its timed descent. With a box abutting stop 182 in alignment with ejector 26, it will be understood that rotation of cam 33 actuates bell-crank 31, and withdraws retracting pressure from bell-crank 27. This is followed by an ejecting movement of plunger 26 in response to the tension urge of spring 185, which causes plunger 26, with its guard 184, to eject the box nearest stop 182 and to move it into stage or station A as has been previously noted. As this ejection is immediately followed by recession of plunger 26 as roller 70 is moved out of the depression 59 in cam 58, the subsequent raising of both stops 18 and 182 permits the second of the pair of boxes to pass under stop 182 to travel toward the second or left half of the machine. Thus in the feed the device selectively automatically feeds alternating unitary boxes to the right and left hand machines.

The dropping of the unpressed unitary box into stage or station A causes the box to be centered within the respective movable abutments 54 with the open mouth of the box pointed upwardly and with its bottom resting upon the vertically movable table 34 while the latter is at its lowest point. As the box settles to rest upon the table the former, follower or anvil block 45 is started downwardly to enter within the open mouth of the box and this is followed by the inward pressing movement of the respective synchronized and coordinated movable abutments 54, as an incident of the rotation of cam 58. As soon as the maximum pressure has been attained by the abutments squeezing the respective unitary box walls against the block 45, the abutments begin to retract as the cam continues its rotation. Following release of the inward pressure of the abutments, the floor 34 of the first stage begins to rise upwardly, following up the form or block 45 as it is vertically retracted. Continued rotation of the cam 58, bringing the movable abutments to their extreme retracted position causes roller 70 of lever 67 to fall into a peripheral recess 59 in cam 58, thus permitting shaft or link 66 to move longitudinally toward the conveyor end of the machine, through the influence of a suitable spring 69. Such spring controlled movement of link 66 results in simultaneous horizontal reciprocation of both ejector plungers 63 and 120, operative to the first and second stages. Movement of the ejector plunger 63 brings it into kicking engagement with the side of the pressed box, which is mounted on the table 34 free of the former block 45, either because the block has moved vertically out of the box as is the usual practice, or else because the box has been stripped from the block 45 by the strippers 53 as the block rises to drop upon the ascending floor 34. The pressed box is now kicked by plunger 63 into the second stage or station B.

At the time of this ejection from station A and the entry of the pressed box into station B, the movable stop 104 has been extended to form a barrier across the rear opening of the second stage to prevent the box from being kicked beyond station B. This inward movement of the stop 104 has been caused in timed relation by the rotation of cam 114 permitting roller 112 to drop sharply, and through the links and levers disclosed in Fig. 8, to interpose the movable stop in the path of movement of the box. The pressed box is now disposed in the second stage or station B and received upon the vertically movable plunger 97, still with the open end up. The upward movement of plunger 97 carrying the box is accompanied simultaneously by the downward movement of the cutter-head, cross-head, and guide 82 and 83, respectively, to permit the cutter assembly on the cutter head to enter within the box. It will be understood that although the linkage controlling the vertical adjustments of the cross head are such as to permit the cutter head to have exact horizontal registration with the stationary complementary parts, yet as a safety measure it is preferred to provide the cutter head guide 83 with depending flanges 89 arranged to abut top surfaces of adjustable stud bolts 199 disposed in the respective stationary abutments 106 and 107.

It will be understood that suitable vertical guides 149 are provided to insure that the box is properly guided in its movement upwardly so as to be properly disposed relative to the corner blocks 117. As soon as proper vertical registration of the cutter device within the box, and relative to the stationary complementary shearing elements has been secured with the slidable cutter substantially in the middle of the box and out of engagement with both sides thereof, a cutting cycle is initiated and consummated by the movement of lever 95. Cam 93 being rotated, the lever 95 is oscillated so as to cause the cutter on one side of the cutter head to pierce the side of the box by movement of the cutter head in one direction, followed by retraction of the cutter from the side just cut and cutting of the opposite side, followed by a return to the normal mid-position. It is worthy of note in connection with this cutting operation that a slight clearance is provided between the parallel complementary shearing edges so that the box may be shifted slightly laterally as the cutter works on one side wall and then upon the other side wall. This is of advantage in facilitating insertion and removal of the boxes, in securing a clean smooth cut, and in saving the box from strains during the cutting operation. These advantages would be minimized if it were attempted to cut both sides of the box simultaneously.

It will be understood that the trimming or cutting operation in the preferred form provides a box as shown in Fig. 13 in which the composite side walls have their upper surfaces cut in exact registration with a horizontal plane parallel with the bottom 11 of the box, while the upper part of the inner surface of the end wall is extended from the outer surface of one side wall to the outer surface of the other side wall across the respective side walls. Completion of the side trimming, and return of the cutter head to the neutral mid-position in its guide, finds the cutter head subjected to elevating pull through downward movement of link 86 by the action of the cam 93. This also finds plunger 97 being retracted and lowered through the action of the same cam.

While it is usually true that the cutter assembly has a relatively loose fit, at least in one dimension of the box, it may be a little snug longitudinally of the box so that the box may tend to rise with the cutter assembly following the upward movement of the cross-head. For that contingency the stripper 78 mounted on shaft 80 is provided, and normally such downward movement by spring 99 as to exert a stripping action effective against the bottom of the box. This is sufficient to disengage box and cutter, but it must be withdrawn to permit lateral ejection of the box. The retraction of stripper 98 is by means of a tripping lever 119 pivoted upon the stud 109, rigidly carried on the cutter head guide 83 and one end of which engages the shaft 80 in a driving relation such as a yoke and pin connection (not shown), and the other end of which is arranged to abut the rigid stop or abutment 129 mounted on the stationary vertical guide 81. The time cycle is so arranged that as the cutter head guide rises toward the top of its movement and the stripper has been ejected long enough to force the box from the cutter so as to rest freely upon the plunger support 97 when the stripper is smartly retracted when lever 119 engages stop 129. Thereupon station B ejector 120 is brought forward smartly to eject the box from the second or side trimming stage, into the third or end trimming stage of station C. Obviously at this time the movable guide or gauge 104 has been retracted to permit the egress of the partially trimmed box from stage B, but is immediately returned to its guarding position to receive and stop the pressed or untrimmed box moving from stage A.

As the box is kicked forward into stage or station C to abut the solid end abutment 123, the movable guard 154 will be disposed so as to prevent the box from undesired bouncing or lateral movement and the box will sit upon the upwardly moving support 136. Through opposite movement of the vertical shaft 142 in response to movement of cam 135, the box support 136 is used while the box is engaged by the several guides 151 and led to proper vertical position relative to the corner blocks 150 and stationary complementary shearing edges 146. At this time obviously the cutter assembly comprised of the end trimming blades 152, mounted on the horizontally slidable cutter head 126, are centrally disposed so as to provide clearance enough to permit the ends of the box to extend above the anvil edge portions 146. It should be observed at this moment that a downwardly spring pressed plunger 186, mounted on the shaft 187, and pressed downwardly by the spring 188, is provided in the fixed cutter head guide 125 and so arranged as to hold the box steady and substantially free from endwise movement, in a position to force the box downwardly out of the cutting areas when the trimming of the ends has been completed and the geared table support 136 starts to retract. It will be understood that a complete cycle of end trimming of the box through appropriate movements of the bell-crank 128 comprises a movement from mid-position in one direction to cause one movable cutter 152 to trim one end of the box, and the completion of the trimming cycle comprises withdrawal of the cutter from the end which has been trimmed while the other cutter trims the other end of the box and then both return to the normal mid-position.

Subsequent to the completion of the trimming of the ends and the downward movement of the box upon the gear actuated supporting table 136 the movable guard 154 is elevated out of the path of exit of the completely trimmed box, and immediately thereafter plunger 163 is caused to move transversely of the station C to eject the box laterally of the station. The plunger ejector 163 is immediately retracted and the guard 154 is dropped downwardly so that the proper entry of the succeeding box into the station or stage C may be permitted.

If desired suitable air jets or blowers 159 may be provided to blow waste scraps from the machine, as shown in Figs. 1 and 5.

It will be observed that with the machine described and disclosed in the drawings, there is provided an automatic device arranged to take a series of unitary but unpressed boxes, to distribute them automatically so that alternate boxes are delivered to right and left hand batteries of units of a plurality of stations, in the disclosure a left and right hand station, although obviously capable of further amplification in numbers. It will be observed further that a box placed upon the conveyor 17 is automatically pressed, and the ends and sides trimmed as desired, without the intervention of the human hand, and is delivered as a pressed and trimmed box in condition to be wrapped as desired. It will be clear stages in the machine can be altered or varied as desired without departing from the spirit of the invention. Thus the pressing stage may be eliminated from this machine and the second and third trimming stages may be combined into one if desired. If desired, this machine or parts thereof may comprise intermediate machine stages in a complete box forming machine which begins with scoring and folding and ends with a complete wrapped box. Obviously many changes and alterations and modifications may be made in this invention without departing from the spirit and scope thereof. Thus the invention may be used to cut through a single wall instead of through each of substantially parallel spaced walls. Such modifications are to be construed as within the scope of the invention and the following claims unless the latter are otherwise specifically limited.

We claim:

1. A box trimming machine comprising knife means for cutting transversely across a wall of a box from the inside to the outside thereof.

2. A box trimming machine comprising means for supporting a box, and knife means for trimming the edge of a wall of the box with a cut passing from the inside to the outside thereof.

3. A box trimming machine comprising means for supporting a box, a horizontally reciprocatable cutter head, a cutter assembly on the cutter head, means for moving the cutter assembly vertically of the box to enter within the box, and means for reciprocating the cutter to alternately trim opposite walls of the box.

4. A box trimming machine comprising means for pressing a unitary box, means for trimming the side walls to a level lower than the ends, and means for trimming the end walls.

5. A box trimming machine comprising a side trimming and an end trimming station, means in the side trimming station for elevating the box, a side trimming cutter assembly, means for moving the assembly vertically to enter within the box, means for reciprocating the cutter assembly to trim the sides, said first and second mentioned means arranged to function to lower the box while elevating the cutter, and means for ejecting the box from the side trimming stage into the end trimming stage.

6. In a box trimming machine for trimming unitary boxes having inner and outer nested elements, an anvil, a cutter movable relative to the anvil, the cutter having horizontal and vertical edges, and means for supporting the side wall of a box between the anvil and cutter to form an upper edge surface of the side wall of the box of the upper registering surfaces of the nested elements.

7. In a box trimming machine, means for supporting a box, an anvil portion, a cutter portion, means for positioning a box wall between the anvil and cutter portions, and means for securing relative movements of the anvil and cutter portions to transversely cut the wall of the box from the inside to the outside thereof.

8. In a box trimming machine, a reciprocating cutter having fore and aft blades, a box support, a pair of spaced complementary shearing elements arranged respectively to be laterally engaged by a box wall during the movement of a blade toward the respective elements, and means for reciprocating the cutter so as alternately to engage opposite walls of a box.

9. In a box trimming machine, means for pressing the walls of a box, means for ejecting the box from the pressing means, means for trimming the side walls of a box, means for ejecting the box from the side trimming means, means for trimming the ends of a box, and means for ejecting the box from the end trimming means, means for synchronously actuating the plurality of ejecting means.

10. In a box trimming machine, a vertically movable support, a vertically movable cutter guide, a transversely movable cutter slidable in the cutter guide, blades on the cutter, means for moving the cutter guide downwardly while the box support is raised and arranged to permit the blades to be disposed within a box, fixed cooperating blades arranged to reinforce a box, and means for imparting three successive reciprocations to the movable cutter, whereby to serially cut through opposite side walls of a box and to return to a neutral mid-position relative to said box.

11. In a box trimming machine, a horizontal guide, a cutter head slidably mounted in the guide, blades on opposite ends of the cutter head, fixed complementary shearing blades, means for disposing a box in such relation to the complementary blades as to have the box ends extend vertically between the fixed blades and the respective blades on said cutter, and means for reciprocating the cutter head.

12. In a box trimming machine, a vertically movable support, a vertically movable cutter guide, a transversely movable cutter slidable in the cutter guide, blades on the cutter, means for moving the cutter guide downwardly while the box support is raised and arranged to permit the blades to be disposed within a box, fixed cooperating blades arranged to reinforce a box, means for imparting three successive reciprocations to the movable cutter, whereby to serially cut through opposite side walls of a box and to return to a neutral mid-position relative to said box, and automatic means for ejecting the box pursuant to the reciprocations of the cutter.

13. In a box trimming machine, a horizontal guide, a cutter head slidably mounted in the guide, blades on opposite ends of the cutter head, fixed complementary shearing blades, means for disposing a box in such relation to the complementary blades as to have the box ends extend vertically between the fixed blades and the respective blades on said cutter, means for reciprocating the cutter head, and automatic means for ejecting the box pursuant to the reciprocations of the cutter head.

14. In a box trimming machine, relatively movable cutting means for transversely cutting through the side walls of a box in substantial parallelism with the bottom of the box and perpendicularly in alignment with the inner surface of the end wall of a box to form a recessed wall to receive a lid, and means for automatically relatively moving said means.

15. In a box trimming machine, relatively movable cutting means for transversely cutting through the side walls of a box in substantial parallelism with the bottom of the box and perpendicularly in alignment with the inner surface of the end wall of a box, means for automatically relatively moving said means, and means for automatically feeding a box to the relatively movable cutting means.

16. In a box trimming machine, relatively movable cutting means for transversely cutting through the side walls of a box in substantial parallelism with the bottom of the box and perpendicularly in alignment with the inner surface of the end wall of a box, means for automatically relatively moving said means, means for automatically feeding a box to the relatively movable cutting means, and means for removing the box after such relative movement.

17. In a box trimming machine in combination, a support, a cutter head, means for securing guided relative vertical movement of the support and the cutter head so as to dispose the cutter head within the walls of a box mounted on the support, a pair of spaced vertical blades mounted on said cutter head and so spaced as to fit substantially within the walls of the box, a horizontal blade disposed between the vertical blades, means for horizontally reciprocating said cutter head so that the vertical and horizontal blades cut outwardly through a vertical wall of said box, and anvil means disposed outwardly of said box and relative to which said horizontal reciprocation is made.

GEORGE H. SNYDER.
ALLEN G. SYNDER.